No. 612,376. Patented Oct. 11, 1898.
T. R. BRIDGE.
VEHICLE WHEEL.
(Application filed Dec. 21, 1897.)

(No Model.) 2 Sheets—Sheet 1.

ATTEST
INVENTOR.
Thomas R. Bridge
By H. F. Fisher Atty

THE NORRIS PETERS CO., PHOTO-LITHO., WASHINGTON, D. C.

No. 612,376. Patented Oct. 11, 1898.
T. R. BRIDGE.
VEHICLE WHEEL.
(Application filed Dec. 21, 1897.)
(No Model.) 2 Sheets—Sheet 2.
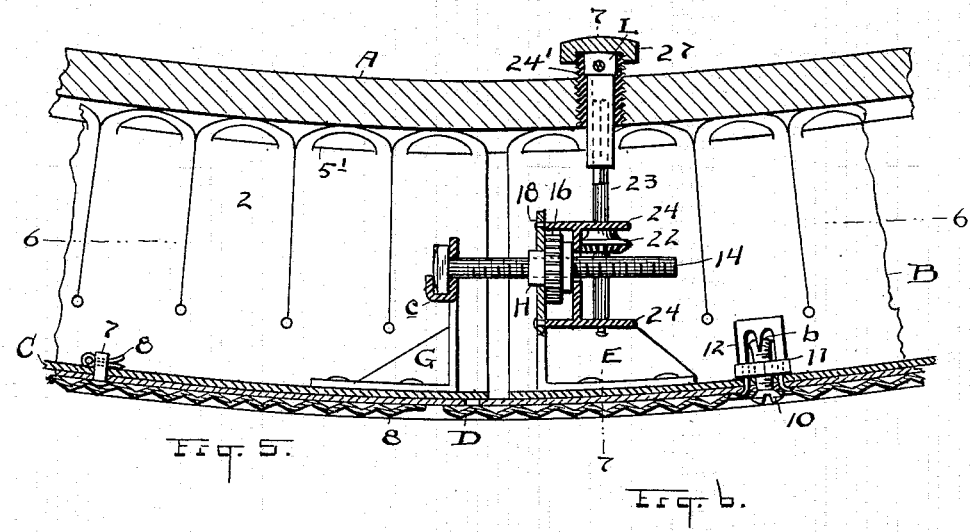
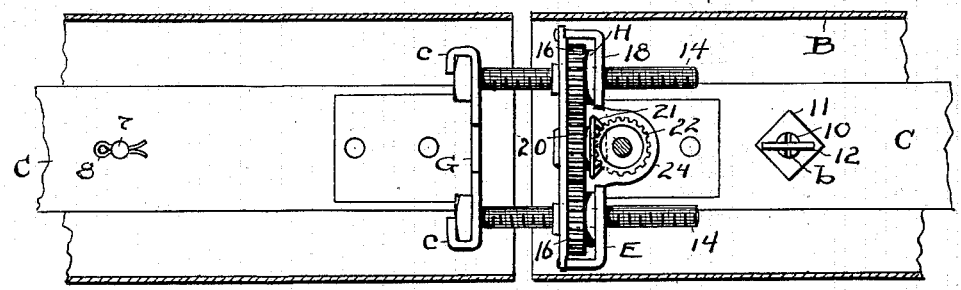
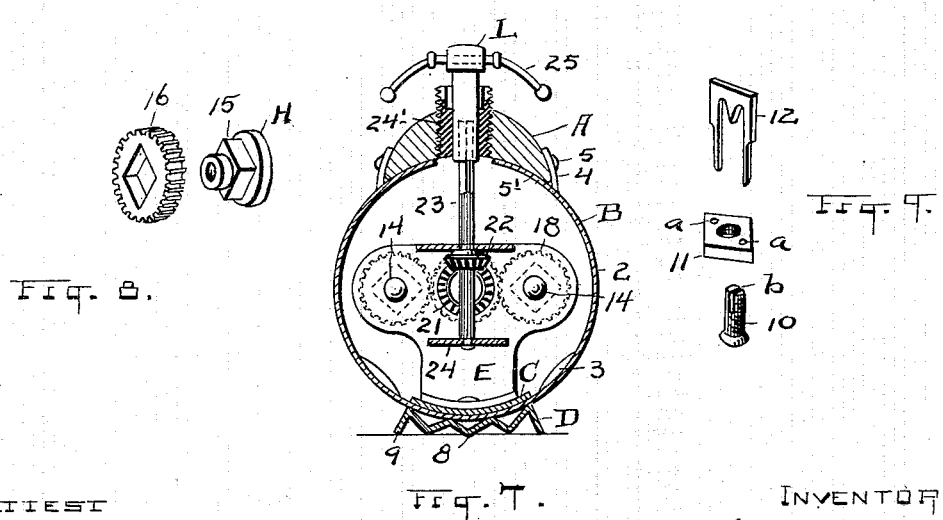
ATTEST
INVENTOR
Thomas R. Bridge
By H. F. Fisher ATTY

UNITED STATES PATENT OFFICE.

THOMAS R. BRIDGE, OF AKRON, OHIO, ASSIGNOR OF ONE-HALF TO JACOB PFEIFFER, OF SAME PLACE.

VEHICLE-WHEEL.

SPECIFICATION forming part of Letters Patent No. 612,376, dated October 11, 1898.

Application filed December 21, 1897. Serial No. 662,853. (No model.)

*To all whom it may concern:*

Be it known that I, THOMAS R. BRIDGE, a citizen of the United States, residing at Akron, in the county of Summit and State of Ohio, have invented certain new and useful Improvements in Vehicle-Wheels; and I do declare that the following is a full, clear, and exact description of the invention, which will enable others skilled in the art to which it appertains to make and use the same.

My invention relates to improvements in vehicle-wheels, but is more especially designed for such wheels as are driven by foot-power, including bicycles, tricycles, and the like, in which a cushioning or springy effect is desirable; and the object of the invention is to supply a wheel in which this effect may be obtained without resorting to the use of rubber and pneumatic cushioning, and thereby avoiding the expense of such tires as well as the constant annoyance and expense of punctured tires.

The invention, therefore, consists in a wheel constructed substantially as herein shown and described, and particularly pointed out in the claims.

Figure 1:
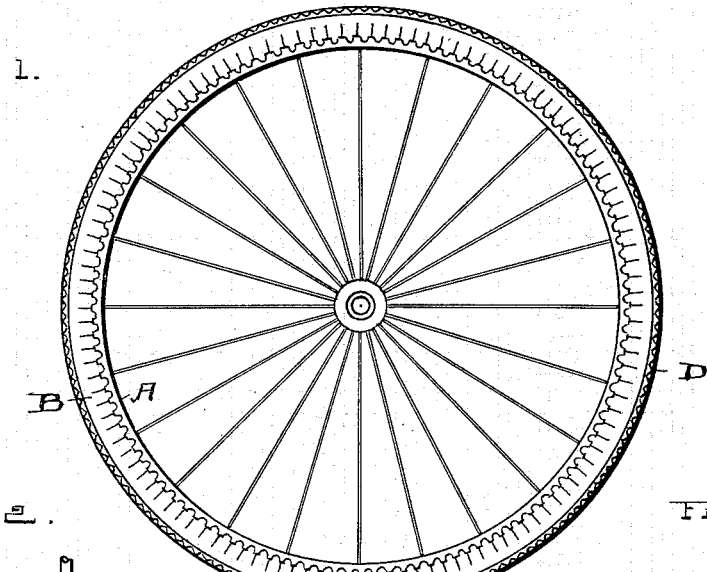
Figures 2, 3:
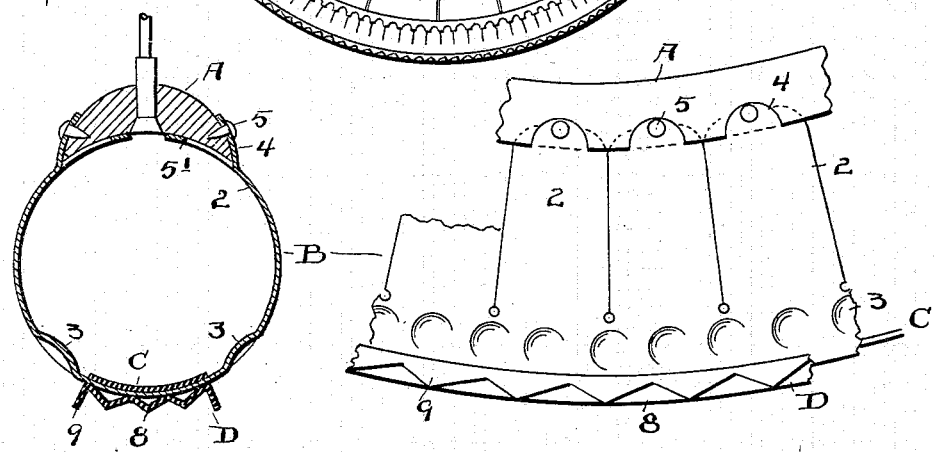
Figure 4:
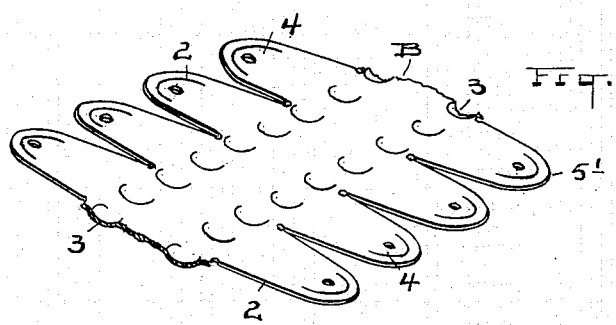

In the accompanying drawings, Figure 1 is a side elevation of a wheel embodying my invention. Fig. 2 is an enlarged cross-section of the tire portion of the wheel. Fig. 3 is a side elevation of a section of the tire portion of the wheel. Fig. 4 is a perspective view of a section of a plate which has been fashioned to form the tube of the tire substantially as hereinafter described. Fig. 5 is a sectional elevation of a portion of the tire where the ends of the tube come together. Fig. 6 is a plan view of the same section on line 6 6, Fig. 5, looking down. Fig. 7 is a cross-section taken on line 7 7, Fig. 5, and showing an elevation of the tightening mechanism for the tube. Figs. 8 and 9 are perspective views of details of the tightening and securing mechanism, as hereinafter fully described.

The foregoing views show a construction of what may be termed the "tire" of a wheel in which the desired spring or yield in the tire corresponding to the pneumatic effect in the tire used to-day is obtained, in conjunction with perfect durability, so that all the good results of a pneumatic tire are present in this construction without the objections of puncturing and the attendant annoyances which are well known to be common to the pneumatic tire.

Now referring to the drawings, A represents the usual wooden rim of a cushion-wheel, the same as in a pneumatic wheel, and my wheel is constructed altogether the same as a pneumatic wheel up to and including this part. B represents what may be termed the "tire-tube" as it appears, for example, in Fig. 2. This tube is made ordinarily from a plain flat strip of suitable light metal, which is placed into dies and developed into the shape shown in Fig. 4 preparatory to bending to tubular form, as in Fig. 2.

In Fig. 4 it will be seen that along each edge of the plate there is a series of leaves 2, and at the base of these leaves, along each side, are a series of concavo-convex depressions 3, designed to give stiffness and strength to the tube at this point. These depressions come along at the side of the tread, as clearly seen in Fig. 2, and bring strength at the point where it is needed. Then in order that the said leaves may be fastened to the rim A, as seen in Fig. 2, I develop out of the extremity of each one a finger 4, which is perforated to receive a fastening-pin 5, and the said fingers along each series are bent outward to engage upon the outer surface of the rim, while the extremity 5' of the leaf itself retains substantially the curvature of the side of the leaf and passes beneath the rim into the concavity thereof, as clearly seen in Fig. 2. Thus the said leaves may be said to be "split" at their extremities and made to conform to the shape of the rim on both sides, and when secured as shown in said figure make a firm and durable engagement. It should of course be stated that before this fastening upon the rim A occurs the tube B is bent to the curvature shown in Fig. 2, and it is fastened upon the rim by working from the middle portion toward the extremities, (shown as brought nearly together in Fig. 5,) but before the tube is thus placed in position the reinforcing plate or band C within said tube and immediately within the tread thereof is placed in position likewise, as shown in Fig. 2, and is secured by any suitable means—such, for example, as shown in Fig. 5, where we see a short pin 7, having a key 8 passing through the inner eye thereof to engage the said plate firmly and securely upon said tube. The said parts might, however, be otherwise fastened together before the plate is bent into tubular form, if desired, and the said plate is given the same transverse curvature as the tube itself.

It will be understood that all the features of the tube B are developed in the dies when the plate for forming the tube is originally cut in shape, so that there is no handwork left to be done in fashioning said plate to the form shown in Fig. 4.

A further feature of this improved tire is the tread D, which has the peculiarity of construction disclosed in Figs. 2 and 3, where it will be seen that the tread is formed from a sheet of suitable light metal bent to occupy the periphery of the tire and having corrugations 8, which run lengthwise thereof, and serrations 9 along the two edges thereof, and the said serrations having such length as to come down to a plane substantially with the several longitudinal corrugations, thus affording a tread which has the full breadth of the said part D and adapting all parts thereof to bear a portion of the weight. This also enables me to use a comparatively light sheet of metal for making the tread, and yet leaves sufficient firmness and durability in the tread to answer all purposes. The tread of the tire thus constructed is held in its position by the parts shown in Figs. 5 and 9, consisting of a split screw 10, a nut 11, and a staple 12. The screw is first passed through the parts when the nut 11 is turned into place, and then in order to prevent the nut from loosening the staple 12 is placed into position through the holes a in the nut and into the slit b of the screw, and the points thereof are riveted on the outside, as seen in Fig. 5. This both prevents the screw from working out and the nut from working loose upon the screw, as both parts are locked by the staple.

Now in order that a tire thus constructed and united may be supported upon the wheel and held in such manner that it may be tightened as occasion requires I have provided each extremity of the tube B with a bracket E and G, respectively, and the ends of the tube are firmly tied together through these internal brackets by means of threaded bolts or shafts 14. These bolts have square heads engaged in the bracket G and extend through the bracket E, and arranged on each one is a nut H, having an angular portion 15, upon which is mounted a small gear 16, and these parts are supported within the keepers 18, fixed to the bracket E, and the bolts 14 of course pass through both said parts. These gears 16 are opposite each other, and between them is a pinion 20, with which both are geared and by which they are rotated, and thereby rotate the nuts 15 to tighten up the ends of the tire. The pinion 20 is rigid with a bevel-wheel 21, which is operated by a bevel-wheel 22 on the shaft 23, having its support in the horizontal bearings 24, projecting from the bracket E. Then in order that the said shaft 23 may be reached from the outside and yet protected I provide a key L. This key passes through a threaded bushing 24', set into the rim A from the inner side thereof, and the stem of the shaft 23 projects into this bushing and is shouldered, so as to be engaged by the said key. The key itself has arms 25, which are useful for turning it, and when out of use they rest down in recesses in the exposed extremity of the bushing 24', upon which is engaged the cap 27, as in Fig. 5, thereby closing the said bushing from the outside and locking the shaft 20, so that there can be no rotation thereof nor of the bolts 14 to become released by the use of the wheel. Then if occasion requires the further tightening of the tire the cap 27 is removed, the key L raised to disengage from the bushing 24', and the pinions 16 and nuts 15 are turned as much as may be required.

With a tire thus constructed I of course avoid all puncturing and all the weaknesses that attend the use of pneumatic rubber tires and yet obtain as much cushioning or resiliency in the tire as a wheel of this kind demands. It will be observed, furthermore, that all the minor parts for fastening and the like are confined within the tube itself, so that nothing is exposed on the outside but the exterior of the tire, as seen in Fig. 1, and there are no parts to become detached or to loosen through more or less protracted use. Every part is thoroughly locked, and those parts which are intended to be operated are rendered easily accessible and at the same time are perfectly secured when in operation.

I should have stated that the heads of the bolts 14 are firmly held by having the sides of the bracket c bent around them and engaging them, so that no rotation thereof can occur.

Of course it will be understood that the foregoing construction as shown and described shows simply one manner of securing the several parts. Obviously mechanism differing more or less materially may be substituted for the particular means here shown and serve an equally good purpose, and therefore I do not wish to be limited to the details of mechanism as shown, but may employ such equivalent means as experience may suggest or as may be found desirable.

The tread of the tire, as above described, is held in its position by the parts shown in 5 and 9, consisting of split screws 10, a nut 11, and a staple 12. The nut is first put into place, and then in order to prevent the nut from loosening the staple 12 is placed into position through the holes a in the nut and riveted on the outside of the reinforcing plate or band C, this being done before the band C is placed in position in the tube. After being secured the tread is fastened by the screw passing through the several parts, the slit B spreading when coming in contact with the staple 12, as seen in Fig. 5. This both prevents the screw from working out and the nut from working loose upon the screw, as both parts are locked by the staple and permits of the tread being changed without disconnecting the other parts.

I claim—

1. A spring-metal tubular body for a wheel-tire having transversely-split sides forming a series of projections and the said projections each divided to engage on both sides of the rim of a wheel, substantially as described.

2. The wheel having a suitable rim, the spring-metal tube on said rim having a series of separate projections along each side, said projections divided and engaging both beneath and over the top of said rim and fastened thereto, substantially as described.

3. A body portion for spring-metal wheel-tires formed with a series of independent leaves along each edge curved to form the sides and top of the tube and having its leaves divided at their points to be attached to the inner and the outer sides of the rim of the wheel, in combination with the rim of the wheel, substantially as described.

4. The tubular body of the tire, the reinforcing-plate within the said body and the corrugated tread on the outside thereof, substantially as described.

5. The body of the tire having transversely-split sides and the depressions in series along the sides thereof at the bottom of the split portions, and the corrugated and serrated tread between said depressions, substantially as described.

6. The tire consisting of the body having the series of depressions along each side and the tread in a separate piece formed with longitudinal corrugations and serrated side edges, substantially as described.

7. The tubular body and the brackets on the ends thereof, a pair of bolts through said brackets, nuts on the said bolts and gears on said nuts, in combination with a shaft and pinion to rotate both said gears and means to turn said shaft, substantially as described.

8. The body of the tire having a series of leaves along each side and the extremity of each leaf having a portion thereof bent inward to engage under the rim of the wheel, substantially as described.

Witness my hand to the foregoing specification this 30th day of November, 1897.

THOMAS R. BRIDGE.

Witnesses:
JOHN GRETHER,
BLANCHE P. ALLYN.